United States Patent [19]

Daudi

[11] Patent Number: 5,388,330
[45] Date of Patent: Feb. 14, 1995

[54] METHOD FOR MAKING DISC WHEELS

[75] Inventor: Anwar R. Daudi, East Lansing, Mich.

[73] Assignee: Motor Wheel Corporation, Lansing, Mich.

[21] Appl. No.: 133,888

[22] Filed: Oct. 12, 1993

[51] Int. Cl.⁶ ............................. B60B 1/06; B21H 1/02
[52] U.S. Cl. ............................. 29/894.323; 29/894.325; 301/63.1
[58] Field of Search ................. 29/894.322, 894.323, 29/894.325; 72/353.4, 353.6, 354.2; 301/63.1

[56] References Cited

U.S. PATENT DOCUMENTS

| | | |
|---|---|---|
| 2,586,029 | 2/1952 | Greenshields et al. . |
| 2,649,886 | 8/1953 | Palmer . |
| 2,826,161 | 3/1958 | Palmer . |
| 3,143,377 | 8/1964 | Bulgrin et al. ............. 29/894.325 |
| 3,298,218 | 1/1967 | Gollwitzer . |
| 3,530,717 | 9/1970 | Gregg . |
| 3,564,898 | 2/1971 | Stettler . |
| 3,580,043 | 5/1971 | Gollwitzer . |
| 3,581,550 | 6/1971 | Waterbury . |
| 3,688,373 | 9/1972 | Gregg . |
| 3,729,795 | 5/1973 | Roper . |
| 3,855,837 | 12/1974 | Philipp . |
| 4,143,449 | 3/1979 | Main et al. . |
| 4,279,287 | 7/1981 | Daudi et al. . |
| 4,280,426 | 7/1981 | Swan . |
| 4,304,034 | 12/1981 | Trevarrow . |
| 4,354,407 | 10/1982 | Daudi et al. . |
| 4,378,623 | 4/1983 | Zimmermann . |
| 4,809,529 | 3/1989 | Shinozawa et al. . |
| 5,010,759 | 4/1991 | Yokomizo et al. . |

OTHER PUBLICATIONS

SAE SP897–Autobody Stamping Applications and Analysis–Society of Automotive Engineers, Inc. Feb., 1992.
Metals Handbook–8th Edition, vol. 4, p. 182.

*Primary Examiner*—P. W. Echols
*Attorney, Agent, or Firm*—Barnes, Kisselle, Raisch, Choate, Whittemore & Hulbert

[57] ABSTRACT

An improved wheel disc and disc and rim wheel assembly, and method and press apparatus for manufacturing the same. The wheel disc is adapted for telescopic press fit precision mounting into a mating wheel rim to form the wheel assembly. A flat disc blank is progressively die formed into a disc preform having a cross-sectional contour proximating that of the finished disc. The disc preform is then placed in a segmental expand punch and die tooling of the press apparatus which operates to apply radial expansion pressure to substantially the entire inner circumference of the peripheral flange portion of the disc preform to thereby permanently deform the same into a finished flange portion on the disc having precision finished predetermined dimensions. A center pilot opening is finish formed in the disc preform in the progressive die forming operation, and then subsequently utilized to locate the disc relative to radial expansion die forming segments in press tooling to thereby ensure concentricity of the finished flange portion upon completion of the permanent radial expansion cold working operation thereon. The apparatus includes an expansion die set-up adjustment mechanism and set-up position sensors to facilitate both initial and running changes in the segmental expansion die set-up exteriorly of the tooling.

10 Claims, 6 Drawing Sheets

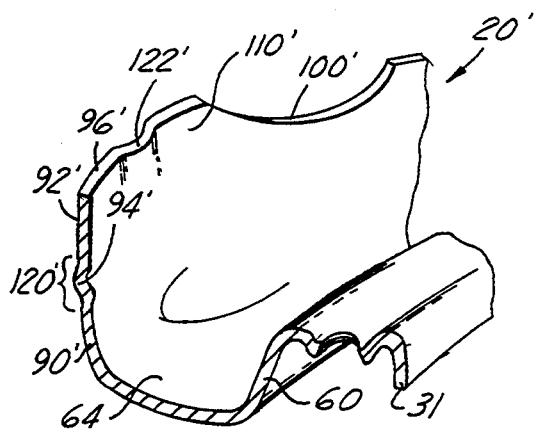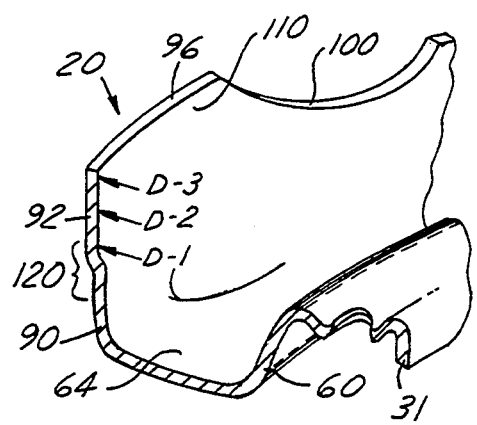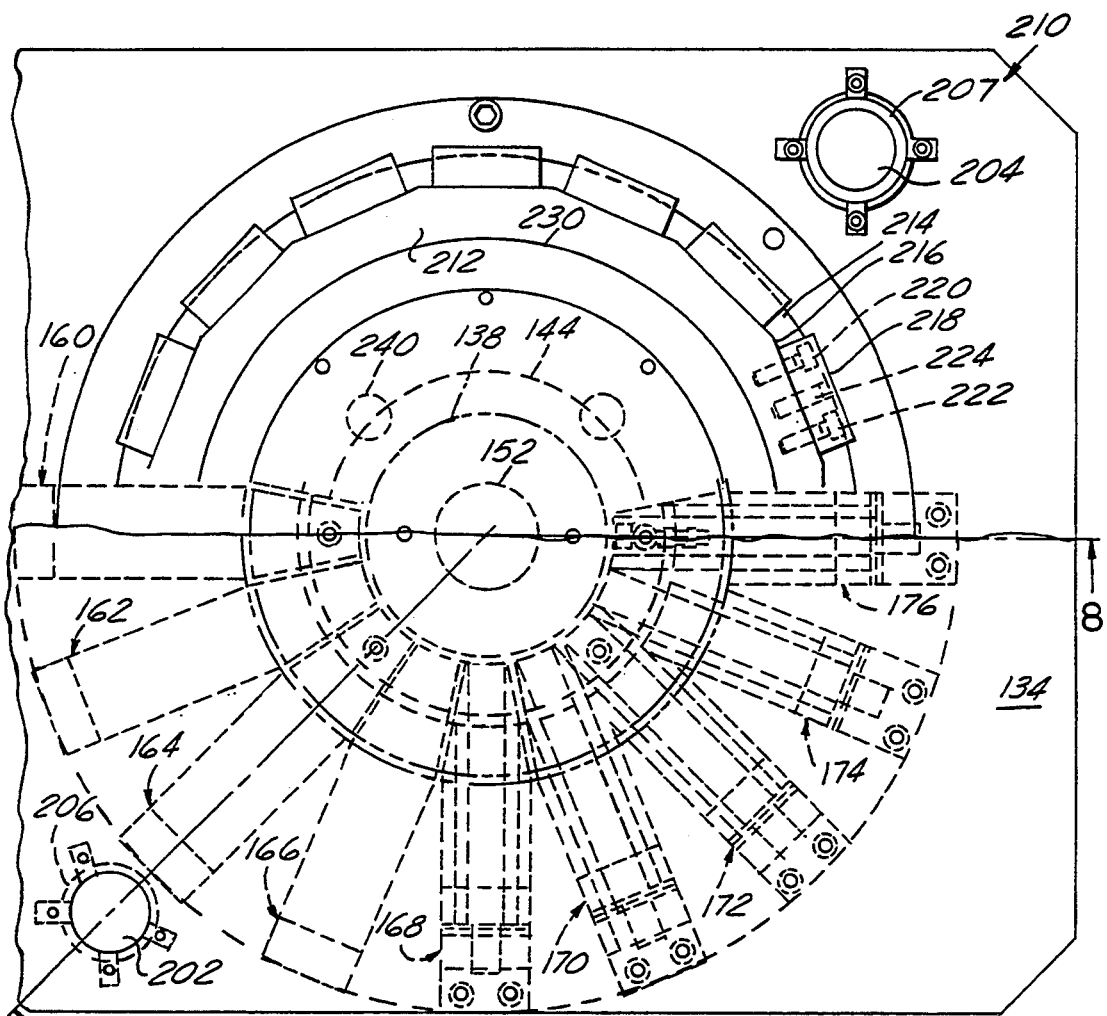

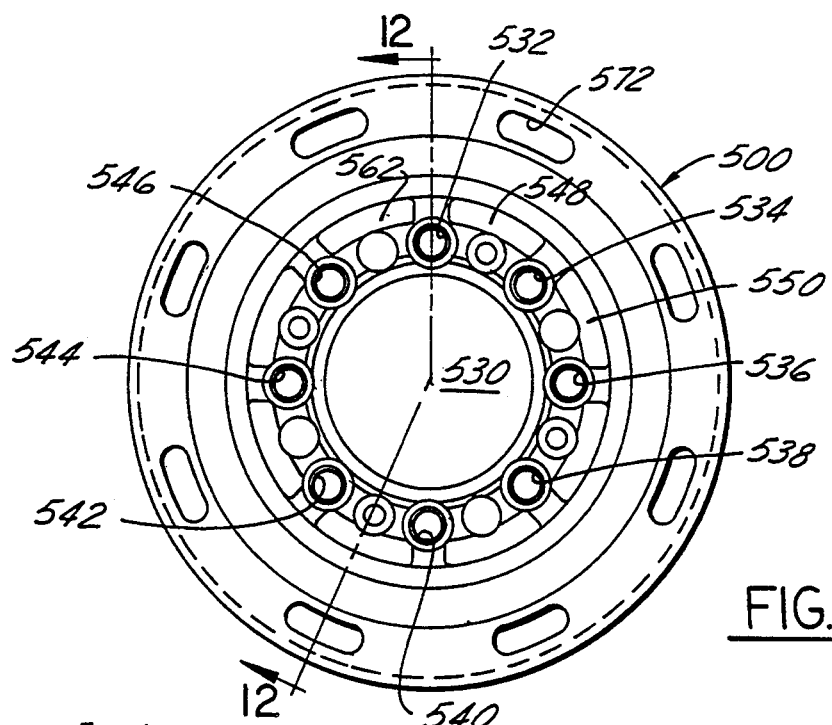
FIG.11
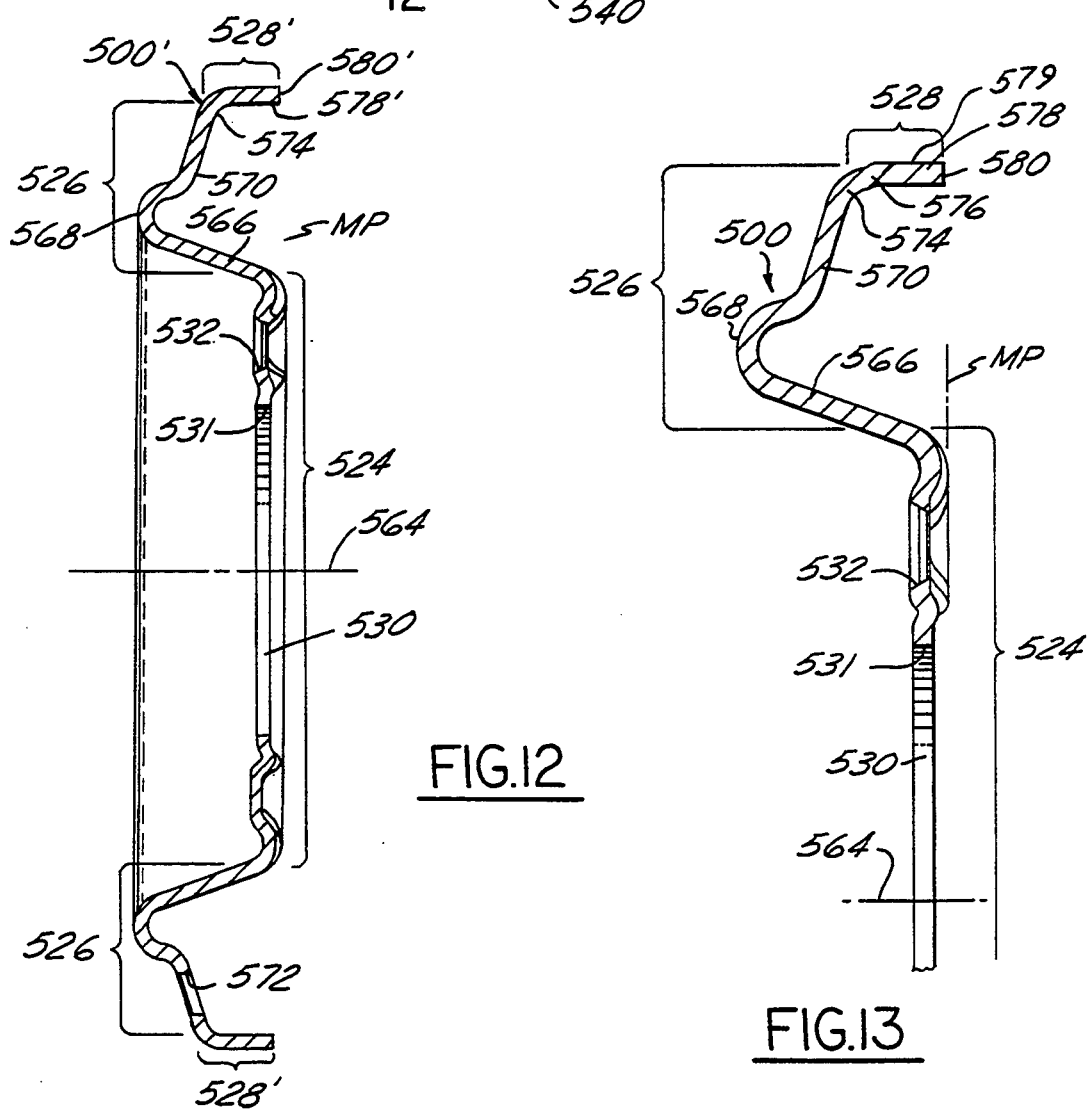
FIG.12
FIG.13

METHOD FOR MAKING DISC WHEELS

FIELD OF THE INVENTION

This invention relates generally to the wheel making art, and more particularly to making of fabricated-type sheet metal wheels.

BACKGROUND OF THE INVENTION

In its most conventional form, a fabricated sheet metal "base" or "plain-Jane" wheel for a motor vehicle is comprised of a one-piece, dual flange, drop-center rim onto which a tire is mounted, and a flanged disc (also variously termed a "spider", "web", "dish", "body" or "center") that supports the rim at the disc flange and provides means for attachment to a spindle hub, brake drum or other like associated part of the vehicle. It is essential that the rim and disc, in their assembled relationship, insure perfect roundness of the rim and accurate axial alignment of the rim with respect to the disc, deviations in the respective directions being termed "radial" and "axial run-out." Vehicle manufacturers establish extremely rigid specifications in the tolerances for these dimensions. When such wheels are manufactured, the rim is normally made as a separate component from the disc and finish formed by profile rolling and final expansion, and the disc is formed in a progressive die stamping operation performed in a transfer press. These two elements are then press-fit assembled together and the disc fixed at its outer peripheral flange to the inner periphery of the rim by welding, riveting or some other like method to form the complete wheel assembly. In an ideal method for attaining the desired wheel roundness, the rim would be perfectly formed in the desired shape before assembly to the disc, and likewise accurate dimensional control would be achieved in making the finished disc. However, in practice, the conventional mass production manufacturing methods and equipment have not achieved such perfect roundness and desired accuracy in these separate wheel parts.

Typically when such wheels have been run with test overloads to induce failure, fatigue cracks have usually occurred in the center of the disc where it is attached to its supporting axle. When the wheels have been fabricated utilizing welding, failures have also occurred in the welds which have attached the rim to the disc. The failures in these areas of the wheel have been so apparent to the industry that an axiom has developed in the automotive industry that you do not machine or diminish the thickness of the disc to improve its accuracy, since it is the "weakest link in the chain".

On the other hand, it is well recognized that wheels are critical to the safety of an automotive vehicle. What makes the problem of wheel design even more difficult is that the analysis of stresses in the metal of the wheel is complicated by many factors which seemingly defy accurate appraisal, including tire unbalances, radial and lateral eccentricities of the rims which in turn support the tires, sufficiently loose tolerances in both starting material dimensions and composition and in manufacturing tooling and fixtures that are necessary for economical manufacture, and stresses that are created by the manufacturing processes used in forming the wheels. In the light of all these variables, and the inability to accurately calculate or predict the stresses involved even with modern finite element analysis computer modeling, the problem of how best to form a wheel in a commercially feasible manufacturing process, and at a cost which the average consumer can afford, has continued since the start of the automotive industry.

In order to improve the accuracy and strength of the finished wheel assembly, it is known to produce disc wheels of sheet steel from two parts by pressing a wheel disc made oversize in respect of the inside diameter of the well base of the rim and by subsequently welding the two parts to one another. Rim accuracy has been improved by various calibrating operations as by permanent deformation expanding or upsetting of the rim, to make it ready for fitting to the disc.

A multitude of U.S. Patents have issued for forming wheel rims. For example, the U.S. Pat. Nos. 2,586,029; 2,649,886; 2,826,161; 3,298,218; 3,564,898; 4,809,529; and 5,010,759 all disclose devices for forming wheel rims.

Furthermore, it is also known to subject completed disc and rim wheel assemblies, after the welding of the rim and wheel disc, to a subsequent truing operation by bending, to permanent set expanding or upsetting and, if appropriate, to additional machining, in order to improve the concentric and planar running of the wheel made from such cold-worked sheet metal parts. This is generally carried out in such a way that, by means of permanent deformation plastic cold working of the wheel mounting center region of the wheel disc and/or of the two rim tire bead seats, with mutual influencing of these two axial and radial reference planes, the geometrical variations are permanently reduced.

For example Gregg U.S. Pat. No. 3,530,717 discloses a machine for rounding a wheel having a disc attached to the wheel rim. The Gregg device has rounding dies to engage and shrink set the rim periphery, which is first formed oversize and permanently assembled to an oversize disc, for bringing the rim into axial and radial alignment. Additionally, when the rim is held in its trued position by the rounding dies, a machining or forming operation is performed upon a locating and/or mounting opening(s) in the disc so that the rim will be true with respect to its axis of rotation as defined by such opening(s). Additional prior art patents which have approached the problem of making such fabricated wheels with the requisite extremely accurate wheel configurations required by the automotive OEM customers, by reworking of the disc and/or rim after permanent assembly thereof, are the U.S. Pat. Nos. to Gollwitzer 3,580,043; Waterbury 3,581,550; Gregg 3,688,373; Roper 3,729,795; Phillip 3,855,837; Main et al 4,143,499; Treyarrow 4,304,034; and Zimmerman 4,378,623.

It can be appreciated that when radially loading an oversized rim to take a permanent set, as set forth in such prior art patents, the tendency will be for the disc and even the rim itself to spring back. Thus, such prior art shrink truing methods must provide for allowance to reduce the spring back. Nevertheless it is difficult if not impossible to completely eliminate the effect of spring back, and hence the disc center opening(s) may still not be located precisely centrally of the rim, and the desired mounting arrangement of the wheel also will not be achieved in the event that the disc center is not exactly parallel with the plane of the rim bead seats.

Another and commercially successful approach to improving wheel uniformity in such fabricated sheet metal wheel assemblies, but still requiring after-assembly processing, has been the non-deformation pierce-after techniques disclosed in the Daudi et al U.S. Pat. Nos. 4,279,287 and 4,354,407, assigned to Motor Wheel Corporation, assignee of record herein.

One well known source of the long-standing problem of inaccuracies resulting in the assembled wheel and disc, leading to such prior art efforts to resolve the problem by after-assembly rework and/or disc hole forming operations, has been the difficulty inherent in the preferred processes for economically forming the wheel disc from sheet metal blanks. In order to satisfy the need for mass production at high production rates, the wheel discs have been formed by cold working in progressive die stamping and draw tooling provided in multiple-stage, high speed transfer press production equipment. Many forming stages as well as subsequent manufacturing operations are often required to transform the flat circular sheet metal starting blank into the various configurations, contours and openings involved in providing the three primary zones of the disc, namely, the central bolt circle wheel mounting portion of the disc, the double reversely curved "window" or "beauty-section" of the disc which extends radially outwardly of the wheel from the center mounting portion, and the inboard curved outer flange portion which forms the disc-to-rim mounting and attachment zone of the disc. The need to progressively shape the disc into the basically different contours and functions of these three primary zones of the disc configuration in such a multiple-stage stamping operation poses complex die design and press transfer problems. For example, as many as eight or more stages may be required in the disc forming transfer press or specifically in separate press operations, e.g., (1) draw, (2) reduce, (3) form center and face, (4) trim O.D., (5) form edge, (6) pierce vent and medallion holes, (7) pierce bolt and center hole and (8) coin vent backside. See for example SAE Paper SP-897 entitled "Autobody Stamping Applications and Analysis" published February, 1992, pages 41–49, and in particular pages 47 and 48 thereof, as well as U.S. Swan patent U.S. Pat. No. 4,280,426 and *Metals Handbook*, 8th Edition, Vol. 4, pp. 182 (FIG. 48), published by the American Society for Metals (1969).

It is to be understood that in the vehicle wheel art and as used herein, the aforementioned term "inboard", as well as its antonym "outboard", are used as directional and relative location adjectives or adverbs analogous to their meanings in nautical and aircraft usage. Thus, "inboard" as used in describing wheel structure means located, facing or extending toward the inside of the vehicle body and/or chassis (or the vehicle longitudinal center line or axis) on which the wheel is mounted in use, or in a position closer or closest to the vehicle longitudinal center axis relative to other structure or components of the wheel. "Outboard" is used in the opposite sense. The "outboard" side of the vehicle wheel is also variously referred to in the trade as the "curb" side, "beauty" side or "street" side. Also, the terms "front" and "rear" sides of the wheel are also used in the trade synonomously with the "outboard" and "inboard" sides of the wheel.

Yet another problem inherent in the progressive stamping of the wheel disc construction resides in the constraints imposed on the selection and design of the disc blank. The initial stock thickness must be as uniform as possible throughout the blank when starting from sheet metal material, but stock thickness variations inevitably occur. Material choice is also limited, i.e., mild carbon or HSLA steel in order to meet both manufacturing formability requirements and the strength and flexure characteristics capable of satisfying the severe fatigue load specifications of current automotive passenger vehicle wheels. Since the cyclical stress levels imposed on the wheel during use vary significantly as between the various portions of the wheel disc, the parameters of the disc blank as well as the ultimate cross-sectional configuration and contours of the wheel disc must be selected and designed to accommodate the fatigue life requirements of the most highly stressed areas. This can result in "material overdesign" with respect to the fatigue life requirements of the lower stressed areas of the disc, and create difficulties in the deep drawing of material of such strength and thickness into the desired disc flange shape.

As a result of these factors, variations in flange thickness and deviations from true cylindrical form (i.e., "waviness") may and often do occur in the disc flange. Attempts to solve this problem by constraining the flange after the "form flange" stage during subsequent disc forming operations in the transfer press pose additional problems of increased tooling cost and part transfer problems (e.g., part "sticking").

Another factor contributing to disc non-uniformity arises in producing one very common form of a "plain-Jane" wheel disc, namely a "scalloped" disc. Such a disc has a peripheral flange interrupted by "scallops" or "chain slots" so as to form "spokes" in the disc, usually four in number at equally spaced intervals around the disc flange. This disc configuration offers advantages in terms of reducing weight and requiring only four short disc-rim attachment fillet welds instead of a 360° fillet weld at the disc flange inboard edge. Also, an octagonal starting blank design can be utilized which permits pattern nesting and resultant material cost savings, as well as "automatic" scallop formation. However, this type of interrupted or scalloped disc flange, as compared to the uninterrupted 360° flange type disc also in common use, further aggravates the problems of distortion, thickness non-uniformity and other dimensional inaccuracies in the uncontrolled disc flange as the disc is progressively finish formed in the transfer press.

When such scalloped or full flange discs are assembled to the rim by press fitting, they can and often do transfer the disc flange distortions to the rim, resulting in assembled wheel inaccuracies despite using accurately made rims. Hence the need hitherto for the aforementioned after-assembly processing techniques and equipment to correct wheel non-uniformity parameters, but which, however, also add significantly to wheel manufacturing costs. Moreover, despite such after-assembly correction processing, certain other manufacturing problems remain uncorrected. Disc flange distortion and thickness non-uniformities can cause disc-to-rim welding problems as well as paint bleed out and plating problems during final wheel coating operations due to poor matching fit of the disc in the rim. Although machining a true surface on the outer periphery of the disc flange might theoretically overcome these problems with some added cost, wheel fatigue life would seriously suffer due to weakening of the disc, and other distortions in the disc and/or rim can be induced during press-fitting due to flange thickness variations uncorrectable and/or introduced by such machining.

OBJECTS OF THE INVENTION

Accordingly, it is an object of the present invention to provide an improved fabricated sheet metal vehicle wheel construction, and an improved method and apparatus for making the same, which overcome the aforementioned problems in an economical and reliable manner.

Another object is to provide a wheel construction of the aforementioned character and manufacturable by the aforementioned improved method and apparatus which has improved uniformity characteristics and increased fatigue life.

A further object is to provide improved apparatus of the aforementioned character which is economical to set-up and adjust.

Still another object is to provide a wheel construction and improved apparatus and method for making the same of the aforementioned character which requires no modification in the conventional progressive wheel disc die stamping and drawing process employed in multi-stage transfer line presses in order to accomplish the foregoing objects.

BRIEF DESCRIPTION OF THE DRAWINGS

Other objects, as well as features and advantages of the present invention, will become apparent from the following detailed description taken in conjunction with the accompanying drawings (which are scaled from engineering drawings unless otherwise noted), wherein:

FIG. 5 is a fragmentary perspective cross-sectional view of a portion of a scalloped wheel disc corresponding to that of FIGS. 1–4 as made by the multiple-stage transfer press drawing, stamping, piercing, etc., operations ready for the last step processing in the method of the invention, and illustrating on an exaggerated scale a flange waviness non-uniformity therein;

FIG. 6 is a fragmentary perspective cross-sectional view of the wheel disc of FIGS. 1–4 as made after final step processing in accordance with the present invention and shown adjacent FIG. 5 for comparison purposes;

FIG. 7 is a fragmentary composite plan view, the lower half of the view being a plan view of the punch and the upper half being a plan view of the die, of a disc flange expand tooling apparatus constructed in accordance with the present invention for performing the method of the present invention;

FIG. 11 is an elevational view of the outboard side of a second embodiment of a wheel disc of the 360° or full-flange type also constructed in accordance with the present invention;

FIG. 12 is a radial cross-section view taken on the line 12—12 of FIG. 11 and illustrating the disc as preformed by the transfer press and ready for the last step processing of the invention;

FIG. 13 is a fragmentary enlarged half-view of the disc of FIG. 12 after being finish formed in the last step processing of the invention;

DETAILED DESCRIPTION OF THE EMBODIMENTS OF THE INVENTION

Scalloped Disc Embodiment

Figure 1:
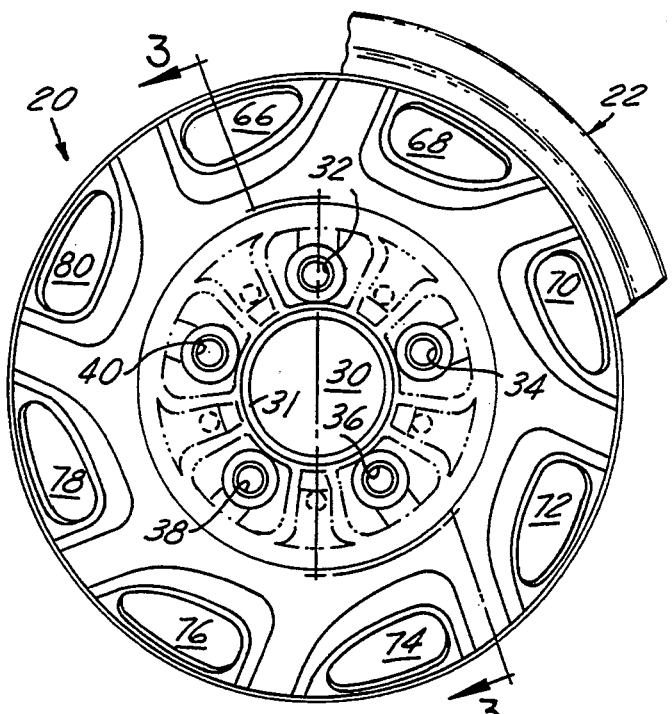
FIG. 1 is an elevational view of the outboard side of a first embodiment of a fabricated sheet metal wheel assembly constructed in accordance with the present invention, the rim of the wheel assembly being shown fragmentarily.
Figure 2:
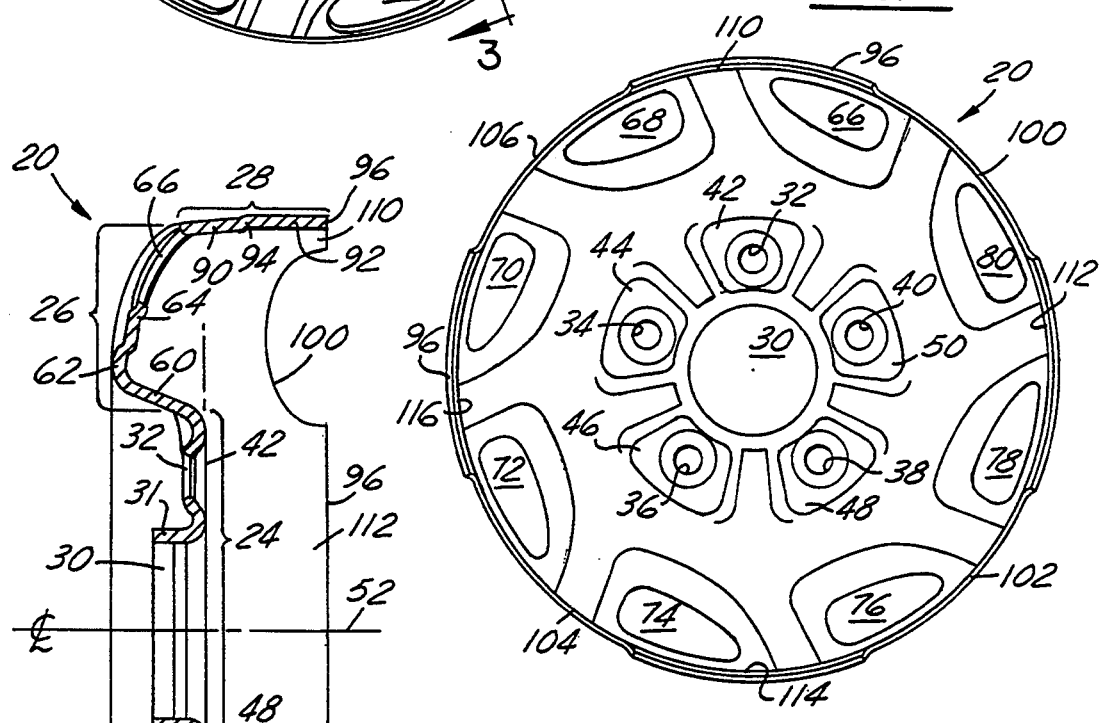
FIG. 2 is an elevational view of the inboard side of the scalloped disc of FIG. 1.
Figure 3:
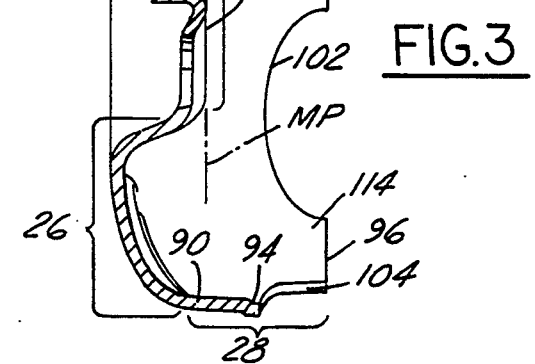
FIG. 3 is a radially cross-section view taken on the line 3—3 of FIG. 1.
Figure 4:
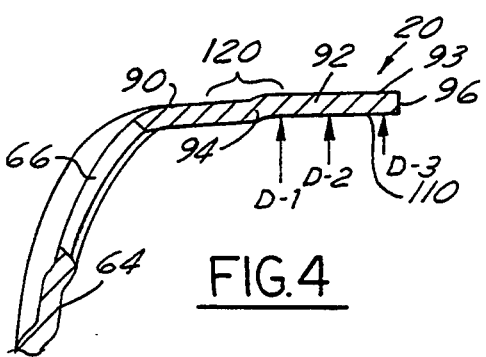
FIG. 4 is a fragmentary view of portion of FIG. 3 enlarged thereover to illustrate detail.

Referring in more detail to the accompanying drawings, FIGS. 1-4 illustrate an exemplary first embodiment of a sheet metal wheel disc 20 made in accordance with the method and apparatus of the present invention. Disc 20 is of the "scalloped" flange, "four-spoke" type intended for press fit telescopic insertion into a wheel rim 22 of the conventional drop-center-well, dual-flange type (FIG. 1) and permanently affixed thereto as by welding (not shown) in a conventional manner. Disc 20 is constructed with the three primary zones customary in this type of disc, namely a central bolt-circle, mounting pad zone 24, a reversely-curved annular hat section and vent window zone 26 and a mounting flange zone 28, as generally delineated by the numbered brackets in FIG. 3. Disc 20 thus has a center pilot opening 30 defined by cylindrical draw neck flange 31, a circular array of five bolt holes 32, 34, 36, 38 and 40 respectively surrounded by mounting pads 42, 44, 46, 48 and 50 (FIGS. 2 and 3) which collectively define a mounting surface plane MP perpendicular to the center line axis 52 of disc 20 (FIG. 3).

The "beauty" zone 26 of disc 20 includes a frusto conical portion 60 extending divergently outboard from mounting pad zone 24 and merging integrally with an annular hat section crown portion 62. Zone 26 also includes a curved window portion 64 extending generally radially outwardly from portion 62 and which is inclined inboard a circular row of window vent openings 66, 68, 70, 72, 74, 76, 78 and 80 provided in disc portion 64 to allow air flow-through ventilation for brake cooling. These window openings in the illustrated embodiment of disc 20 are also aesthetically contoured and provided with embossments to impart a styling feature to disc 20 and thereby enhance the appearance of the wheel assembly 20—22 as viewed from the outboard side of the wheel.

Flange zone 28 of disc 20 includes an annular portion 90 integrally connected to the outboard edge of window portion 64 and extending axially of the disc inboard of the wheel at a conical angle slightly divergent from axis 52, say on the order of 3°. Flange zone 28 also includes a mounting flange portion 92 integrally, joined to portion 90 by an outwardly divergent annular shoulder portion 94, and terminating at an inboard free edge 96. A series of four circumferentially spaced scallops 100, 102, 104 and 106 interrupt edge 96 at four equally spaced angular intervals. Scallops 100–106 alternate with four intervening equally angularly spaced "spoke" portions 110, 112, 114 and 116, thereby providing a so-called "four-spoke" disc of the type in widespread use for OEM automotive passenger vehicle wheel in the thirteen to fifteen inch sizes.

In accordance with the method and apparatus of the present invention, disc 20 is manufactured in two manufacturing sequences. The first sequence comprises the aforementioned conventional multiple-stage cold work forming in progressive die stamping, drawing, trimming, piercing and coining tooling stations provided in a conventional multiple-stage high speed transfer press. The starting material employed is conventionally flat octagonal blanks of sheet metal die cut from strip stock, typically SAE 1010 or HSLA alloy steel, but other sheet metal materials such as aluminum alloys and stainless steel may be employed in special applications. The blank is automatically fed through eight or more stages of the transfer press, which may include such conventional stages known as (1) draw, (2) reduce, (3) form center and face, (4) trim O.D., (5) form edge, (6) pierce vent and medallion holes, (7) pierce bolt and center hole, and (8) coin vent backside. Such progressive transfer press tooling is designed and adapted to impart the final form of all the features of disc 20 described hereinabove except for final forming of disc flange zone 28. The stamping, drawing, piercing and coining operations performed progressively in the transfer press tooling on the central bolt-circle mounting pad zone of disc preform 20' shown in FIG. 5, have been found to produce the requisite accuracy within close tolerances of the mounting plane MP, chamfered nut seats of the bolt holes 32–40, diameter of pilot opening 30 and concentricity of bolt hole circle and draw neck flange 31. However, it has been found that this is not true of the peripheral flange portion of the disc preform 20' as it emerges from the transfer press operation as shown in FIG. 5. Nevertheless, a disc so formed at this stage is the same as prior art discs which were then directly press-fit assembled individually into rims without further alteration.

Those features of disc preform 20' which correspond to the previously-described finished structural features of flange zone 28 of disc 20 are indicated in FIG. 5 by like reference numerals raised by a prime suffix. It will be noted that disc preform 20' as it emerges from the transfer press operation is characterized by an annular band 120' which, in a typical disc having a nominal outside diameter of about twelve inches or 300 + millimeters, may have a dimension axially of the disc of about one-half inch. Band 120' runs from the bottom of scallop 100', outboard into the radially inset annular portion 90 of flange zone 28 and contains the outwardly divergent shoulder portion 94'.

It has been found that, by measurements taken in band 120' diametrically across the disc, this zone exhibits the effects of lack of flange control in the transfer press disc forming operations and as a result is irregular in shape Mounting flange 92' which is generally coextensive axially with the depth of the associated scallops 100' and is integrally connected to band 120' also exhibits these same shape irregularities. An example of such non-uniformity is illustrated in FIG. 5 by the radially inwardly bulging undulation 122' (illustrated on an exaggerated scale to indicate the waviness circumferentially of flange zone 28 exhibited in disc preform 20'). Although such dimensional non-uniformities in flange zone 28 are typically small in magnitude and hence may not be readily detectable by the eye, they are nevertheless readily measureable by standard quality control instrumentation. Hitherto a relatively large disc part tolerance had to be provided to allow for such non-uniformities inasmuch as disc 20' hitherto constituted the finished part for assembly to a rim upon emerging from the disc forming transfer press operation. This in turn resulted in the various wheel assembly non-uniformity problems from such a disc-to-rim assembly set forth hereinabove and which are overcome by the present invention. Therefore, in accordance with the present invention, the disc at this stage constitutes only a preform 20' ready for the second sequence processing in the method of the invention.

Figure 8:
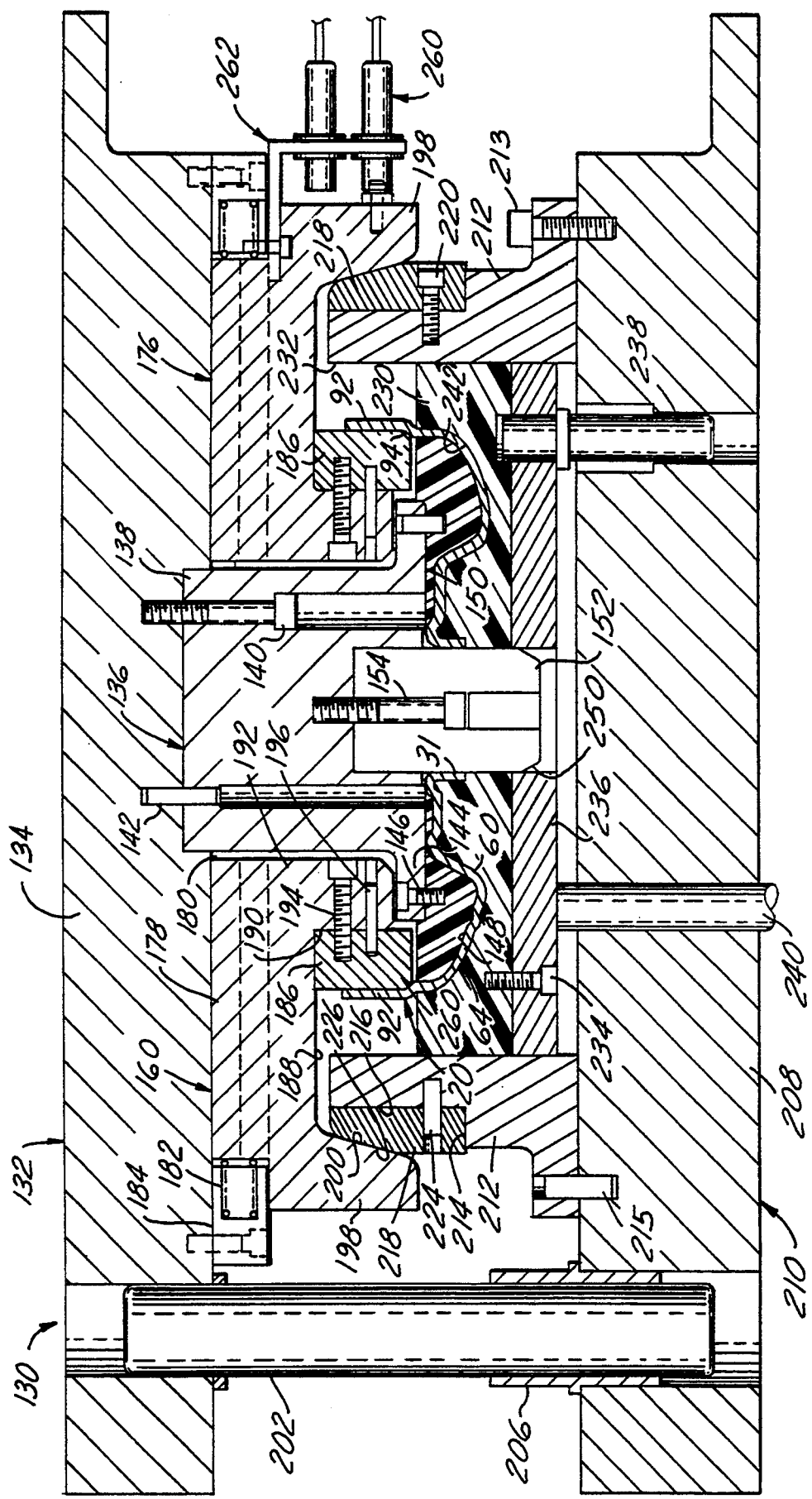
FIG. 8 is a vertical cross-sectional view of the disc flange expand punch and die tooling of FIG. 7 taken generally on the line 8—8 of FIG. 7.

The second sequence of the method of the invention utilized in making the scalloped disc embodiment 20, and the apparatus for performing the same in accordance with the invention, is illustrated in FIGS. 7 and 8. In this second sequence the annular band 120' and the rim-mounting-portion 92' of the flange zone 28 of disc preform 20' are subjected to a further cold working operation in which the shoulder portion 94' and flange portion 92' are each simultaneously uniformly expanded diametrically of the disc preform 20' by a predetermined amount. This is done by radially expanding a segmental expansion die set which simultaneously exerts radial expansions forces against substantially the entire 360° circumference of the inner peripheral surface 110' of flange portion 92. The magnitude of radial expansion is calculated to stretch the disc material in this portion beyond the yield limit of the material, for example ranging from about a 0.2% circumferential elongation near edge 96 to about 0.50% near shoulder portion 94' respectively, i.e., at dimensional zones D-3 and D-1 referenced hereinafter in conjunction with FIG. 6 so that the material enters its plastic range and hence takes a permanent set as so stretched. The diametrical and circumferential non-uniformities in flange portions 120' and 92' are removed by this stretching and expansion action and disc preform 20' is thereby reshaped to the form of the finished disc 20 of the invention as described previously. Thus, the rim mounting portion 92 of flange zone 28 is characterized by a predetermined cylindrical or slightly frusto conical shape (cone angle divergent in an inboard direction), substantially free of waviness and undulations circumferentially of the inner and outer surfaces 110 and 93 of the portion of the disc and having a uniform outside diameter at the outer periphery 93 of flange portion 92 (FIG. 4) within substantially reduced tolerance limits as compared to the corresponding dimensions of portions 120' and 92' of disc preform 20'.

This second sequence forming is preferably accomplished in accordance with a first embodiment of apparatus of the invention shown in FIGS. 7 and 8 wherein a punch and die press of conventional structure (not shown) is provided with disc flange expand tooling 130 of the radially-expansible segmental die type. The expand apparatus tooling 130 thus includes a punch set 132 comprising a platen 134 carrying centrally thereof a disc clamp 136. Clamp 136 includes a cylindrical solid post 138 secured to platen 134 by studs 140 and properly oriented by a guide pin 142. The lower end of post 138 has a flange 144 to which is affixed by studs 146 an annular resilient clamp pad 148 contoured on its lower face to nest within and resiliently engage the inboard surface of disc portions 60 and 64. The lower face 150 of post 138 is flat and perpendicular to the central axis of tooling 130, and is adapted to seat on the inboard surfaces of mounting pads 42–50 of the disc. A cylindrical guide pilot 152 mounted at one end by a stud 154 in post 138 protrudes co-axially downwardly from post face 150.

Platen 134 also carries a circular array of 16 die holders arranged in a circular row encircling post 138 and movable radially of the axis of the same (FIG. 7). Only nine of these die holders 160, 162, 164, 166, 168, 170, 172, 174 and 176 are illustrated in phantom in FIG. 7, and a diametrically opposed pair of these punches 160 and 176 is illustrated in section in FIG. 8. Each die holder, collectively referred to thereinafter as holder 160, has a T-shaped gib head 178 slidable in a complimentary guideway 180 formed in platen 134. Each holder 160 acts against an associated compression spring, indicated schematically at 182, which is disposed in a spring housing 184 attached to the underside of platen 134 and is operative to bias the associated die holder 160 radially inwardly to its retracted position.

Each die holder 160 carries an expand die segment 186 seated at the inner corner junction of an undercut face 188 of the holder and an outer face 190 of a dependent leg 192 of the holder. Die segment 186 is removably affixed to the holder by a mounting stud 194 and located by a pin 196. Each die holder 160 also has a dependent outer leg 198 formed on its radially inner face with a camming surface 200 inclined upwardly and inwardly relative to the central axis of the punch and die tooling. Upper punch tooling 130 also carries a pair of die posts 202 and 204 (FIGS. 7 and 8) which slidably engage an associated bushing 206,207 carried in a die bolster 208 of the lower die tooling set 210 of the press.

Die tooling set 210 is mounted on the press so that bolster 208 is immovable, and the punch tooling set 132 is raised or lowered vertically with respect thereto by the press. Bolster 208 carries an annular cam holder ring 212 affixed by studs 213 to bolster 208 and located thereon by locator pins 215. Cam holder ring 212 has a circumferentially continuous, radially extending shoulder surface 214 provided in its outer periphery, and also has an annular array of sixteen flat cam seating back surfaces 216 equally angularly spaced and extending vertically upwardly (parallel to the tooling center axis) from shoulder surfaces 214 for individually mounting an annular series of sixteen cam dies 218 thereagainst. Each die 218 is mounted by two studs 220,222 and located by a pin 224. Each cam die 218 has an inclined camming surface 226 complimental to die holder cam surface 200 for matching, sliding, camming interengagement therewith. It is to be understood that initial set-up adjustment of the final, fully expanded positions of the individual expand die segments 186 may be obtained by a manual set-up adjustment in which suitable shim stock is inserted between one or more of the cam dies 218 and the associated seating surface 216 of cam ring 212, as will be well understood by those skilled in the art of punch and die apparatus.

This shimming set up adjustment may be facilitated by the provision of a suitable circumferential array of conventional proximity sensors 260, one for each die holder 160 et seq; and each mounted on a suitable bracket 262 fixed to platen 134. Sensors 260 are conventionally constructed and arranged relative to an associated die holder to provide an electrical output signal to a suitable display indicative of the fully expanded die holder position. Such a position sensing system may also be utilized to advantage as part of a conventional feedback open or closed loop computer control system operably coupled to the mechanized set-up adjustment systems of the modified embodiments described hereinafter in conjunction with FIGS. 9 and 10.

Die tooling set 210 also includes a vertically movable die 230 slidably received within the cylindrical inner periphery 232 of cam holder ring 212. Die 230 is removably secured by studs 234 to a support plate 236, which in turn is angularly oriented on bolster 208 by a guide pin 238 and raised and lowered by a plurality of support rods 240 extending through bolster 208. Die 230 has a disc receiving cavity 242 shaped complimental to the outboard face of disc preform 20' for accurate seating of the same thereon with its outboard face facing downwardly and with its axis coincident with the axis of tooling 130. Preferably die 230 is made of a durable but slightly yieldable plastic material and additionally a slight allowance is provided in cavity 242 relative to the disc outboard face contours to permit limited lateral bodily shifting of disc preform 20' when initially seated in cavity 242 so that punch guide pin 152 can shift disc preform 20' slightly bodily laterally, radially of the tooling axis, as a beveled leading edge 250 of guide 152 enters disc draw-neck 31 during the down stroke of punch set 132. This accurately centers the disc preform 20' with the axis of pilot opening 30 and the axis of the bolt hole circle coincident with the tooling center axis.

In the operation of the expand apparatus tooling 130, and in accordance with the second sequence of the method of the invention, punch 132 is first raised sufficiently clear of die set 210 to permit manual or automatic loading of a disc preform 20' into die cavity 242. During the initial upward opening movement of die set 132, camming legs 198 of die holders 160 will clear their sliding engagement with cams 218 and then be driven radially inwardly to their fully retracted positions around post 136 by the associated retracting springs 182.

After disc preform 20' has been so loaded on die 230, downward closing motion of die set 132 commences. During this downward motion the lower free end of pilot 152 first enters pilot opening 30 of the disc preform 20' and beveled leading edge 250 of guide 152 slidably engages the inner periphery of draw neck 31 and thus centers disc 20' on the axis of the tooling. Further downward motion of die set 132 causes the retracted die segments 186 to enter disc 20' with a clearance inwardly from the inner periphery 110' of the disc flange zone 28. As the camming surfaces 200 of holder legs 198 come into contact with and begin their sliding engagement along camming surfaces 226 of cam dies 218 the sixteen die holders are individually driven radially outwardly of the die axis to thereby simultaneously radially expand the array of sixteen expand die segments 186. This camming action is correlated with downward travel of punch set 132 such that die segments 186 are sufficiently retracted to clear the inner periphery 110' of the disc until shortly after the bottom face 150 of post 138 engages mounting pads 42–50 of disc 20' to thereby securely and squarely clamp the disc on die 230 with the disc mounting plane MP perpendicular to the tooling axis. Then, with further downward travel of die set 132, post 138 presses die 230 downwardly against the resistance of the conventional die supporting structure of the press, such as air springs (not shown) operably coupled to rods 240. Die segments 186 at this time are fully inserted into disc 20' such that the lower outer corner 260 of each die segment 186 is radially aligned with shoulder 94' of disc preform 20'.

As die set 132 further descends on its working stroke, the sliding engagement of die holder legs 198 along cam dies 218 concurrently forces all of die holders 160 radially outwardly to force all of die segments 218 into engagement with the inner periphery 110' of flange zone 28. During final travel of die set 132 to a predetermined lower limit, as set by stops (not shown), die segments 186 move radially further outward on their disc stretching stroke to their final outer position shown in FIG. 8, whereupon die set 132 also reaches its lower travel limit. The radial expansion of die segments 186 during this final downstroke travel causes the material of flange 28 to stretch circumferentially by an amount, on the order of a 0.2 to 0.3% elongation, sufficient to plastically work the material beyond its yield point. Flange mounting portion 92' is thereby enlarged in diameter as it is so stretched beyond its yield point and takes a permanent set at the new final diameter established by the expanded outer circumference of die segments 186 (minus a slight spring back allowance). This plastic stretch working of the flange portion 92' cold works the material and also removes any waviness or other circumferential diametrical non-uniformities in flange portion 92' during such expansion. Disc preform 20' is thus converted in this last step of the method to the final form of disc 20 described previously in conjunction with FIGS. 1–4.

Upward travel of die set 132 is then initiated, raising holder legs 198 upwardly along cam dies 218 and allowing the die holders 160 to be driven toward retracted position by their associated retracting springs 182. During the first portion of upward travel, die 230 travels upwardly with punch set 132 to keep the disc mounting pads 42–50 pressed against post face 150 as die segments 186 are retracted radially inwardly clear of the disc flange inner surface 110. When die 230 reaches its upper limit stops (not shown) its upward movement ceases, but upward movement of punch set 132 continues until the punch tooling has cleared the die tooling by a distance sufficient to permit unloading of the finished disc 20.

Upon completion of this second sequence of the disc-making method of the invention as described above, and referring to FIGS. 4 and 6, disc 20 is provided with a rim mounting flange 92 having closely controlled radial dimensions as indicated, for example, by sixteen circumferentially equally spaced measurements taken at the axially spaced radius measuring points D-1, D-2, D-3 shown in FIGS. 4 and 6. For example, in one working example of a scalloped disc 20 made in accordance with the method of the invention, the radius dimension D-1 measured at a distance of 19.5 millimeters axially inboard from disc mounting plane MP showed a variation of 0.06% from the minimum value of this dimension, whereas the same dimension so measured in the disc preform 20' had a variation of 0.32% from this minimum value of its corresponding radial dimension. Similarly, the variation at radius measuring point D-2 taken at 30 millimeters from mounting plane MP showed a variation of 0.11% from minimum value dimension versus a variation of 0.22% from the corresponding minimum value dimension in disc preform 20'. Further, the variation in radius dimension D-3 taken at 38 millimeters from mounting plane MP showed a variation of 0.22% from the minimum value dimension versus a variation of 0.27% in the corresponding minimum value dimension in disc preform 20'. Accordingly, disc 20 in the aforementioned working example exhibited a 50.3% overall improvement in disc mounting flange uniformity as a result of being made pursuant to the method of the invention. Due to the accurate centering of disc preform 20' and clamping location of its mounting plane MP by the tooling 130 prior to and during the flange expand action, concentricity of flange zone 28 relative to the axes of the bolt circle and pilot opening is also greatly improved.

Moreover, when disc 20 of the invention was assembled to a matching rim by conventional press fit and welding, and then subjected to rotary fatigue testing with a tire mounted to the disc and rim assembly, it was also found that the fatigue life of the wheel assembly was increased by three or four times over a similar wheel assembly utilizing a disc 20' manufactured in conventional fashion using only the first sequence of the method of the invention.

It will thus be seen that a wheel disc as made by the foregoing method and apparatus of the invention, provides an improved wheel disc having a rounder disc mounting flange 92 and stronger disc. The reduction in radial run-out in the disc flange also contributes to reduced radial run-out in the assembly of the rim and disc, and hence reduces the run-out in the rim bead seats relative to the wheel center of rotation. This is accomplished by the disc flange expand step and apparatus of the invention at the same production rate as the upstream transfer press, and at considerably less apparatus, processing and scrappage cost than the aforementioned prior art after-assembly permanent deformation and/or non-deformation finish after assembly techniques.

Closer control of the diameter and roundness of the disc flange enables more precise matching of the rim flange diameter to the rim drop-center well mounting diameter. This in turn reduces scoring and other associated problems arising during press-in assembly of the disc in the rim. Closer, more uniform fitting of the disc in the rim also reduces subsequent paint bleed-out problems. Last, but certainly not least, the fatigue life of a wheel assembly incorporating disc 20 of the invention is greatly improved.

Expand Dies Set-up Adjustment Mechanism-First Embodiment

Figure 9:
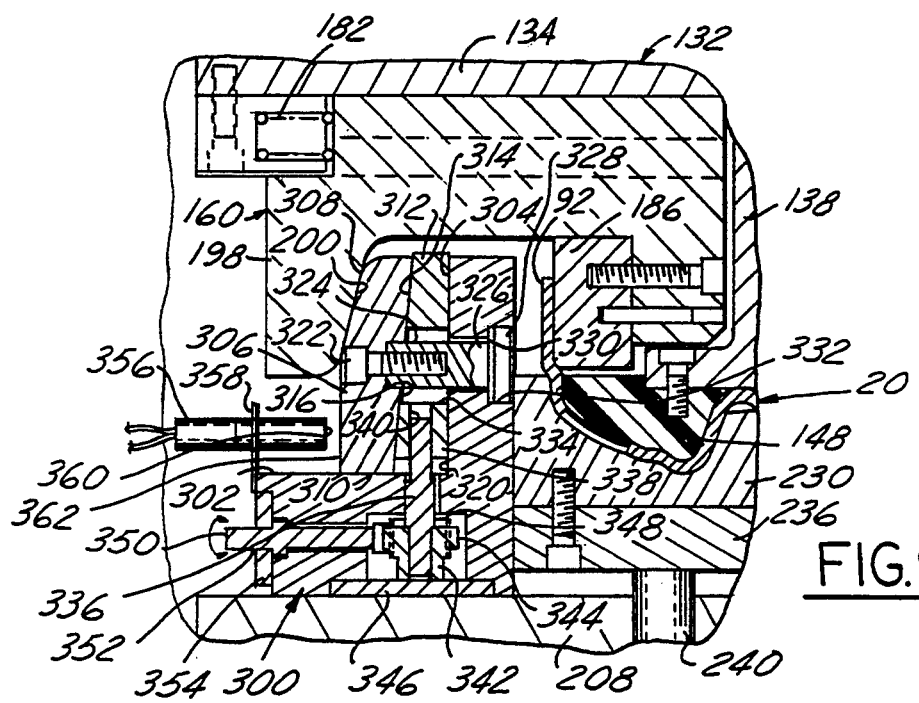
FIG. 9 is a fragmentary vertical cross-sectional view of a portion of the apparatus shown in FIG. 8 but illustrating a modification of the set-up adjustment mechanism of the expand dies.

FIG. 9 illustrates a first modification of the punch and die tooling 130 for providing a shimless expand die adjustment system for the expansion cam dies of die tooling 210. A modified cam die holder ring 300 is substituted for ring 212 of die tooling 210. Cam holder ring 300 is generally L-shaped in radial cross section and has a flat annular surface 302 corresponding to surface 214 of ring 212. A circular array of sixteen flat surfaces 304 individually radially aligned with an associated die holder log 198 are provided on the radially outer periphery of the upright leg of ring 300. Sixteen cam dies 306, each having an inclined camming surface 308, corresponding to surface 226 of cam die 218, are provided one for each of the sixteen die holders 160. Each cam die 306 seats at its lower surface 310 slidably on surface 302, and its set-up position radially outwardly from the vertical center axis of the tooling is determined by an associated one of sixteen adjustment wedges 312 individually interposed between cam dies 306 and the associated faces 304 of ring 300. The radially outer face 314 of wedge 312 is slightly inclined for matched sliding engagement with a complimentarily inclined surface 316 provided on cam die 306, these wedging surfaces diverging from the tooling axis in a downward direction toward die bolster 208. Each wedge 312 is rectangular in radial cross-section and has a radially inward face 320 parallel to and bearing slidably against face 304 to control movement of wedge 312 in a direction parallel to the tooling axis. Each cam die 306 is yieldably pressed against its associated wedge 312, and likewise such wedge 312 against its associated leg face 304, by a stud 322 threaded into a shank 324 of a sleeve bolt 326 to affix the same to cam die 306 in a suitable central through mounting opening therein. Shank 324 is slidably received in a through-bore in leg 304 and has a head 328 which captures a compression spring 330 between head 328 and the shoulder of a counterbore 332.

Wedge 312 has a large center hole 334 for receiving shank 324 therethrough with a large clearance to enable vertical adjustment travel of wedge 312. Such adjustment travel of wedge 312 is produced by rotation of an output shaft 336 having a lead screw 338 at its upper end threadably received in a threaded bore 340 in wedge 312. The lower end of output shaft 336 is fixed in a hub 342 of a helical worm gear 344 which rotatably seats on a retaining plate 346. Gear 344 is rotatably driven by a worm gear 348 fixed on the end of an input shaft 350 journalled in ring 300 and having an input end 352 protruding through and exteriorly of a retaining plate 354 affixed to ring 300.

To vary the set-up adjustment of each cam driver die 306, the externally accessible input end 352 of the associated input shaft 350 need only be rotated to thereby threadably drive wedge 312 up or down as desired to produce the desired corresponding precision movement of cam driver die 306 radially of the die tooling axis and thus control and set the outer travel limit of the associated disc expand die segment 186. To further facilitate such expand die set-up, an array of sixteen conventional proximity sensors 356 are individually mounted on an associated bracket 358 fixed to ring 300 so as to position a sensing end element 360 of each sensor 356 proximate to a lower vertical face 362 of an associated cam driver die 306. Sensors 356 are of conventional design and are electrically coupled in a conventional manner to suitable circuitry (not shown) operable to provide a visible digital read-out of the adjusted position of each associated cam driver die 306.

The high mechanical advantage multiplication ratio provided by the combination of the worm gear drive 342,344, the lead screw drive 338,340, and the shallow wedging angle between surfaces 314 and 316 enables precise minute incremental adjustment of cam driver 306 to be obtained by mutiple revolutions of input shaft 350. This high ratio drive also provides a lock-up friction angle system for resisting the heavy forces exerted by the associated leg 198 of the die holder 160 during the radial expansion and resultant circumferential stretching of disc flange 92. Quality control measurements of the expanded finished diameter of disc flange 92 indicating a need for diametrical correction adjustments therein may be readily translated back into selected adjustments of individual driver cam dies 306 as and when needed. The press set-up operator need only observe the digital read out for each cam driver and make the corresponding adjustment thereto by suitably rotating the selected input shaft 350 for both initial set-up and as a running set-up adjustment. Hence, as contrasted with the manual shimming requirement of the apparatus of FIG. 8, this can be quickly accomplished externally of the die tooling, without requiring access to cam driver dies 306, and with the punch and die in either closed or open condition.

Expand Dies Set-Up Admustment Mechanism-Second Embodiment

Figure 10:
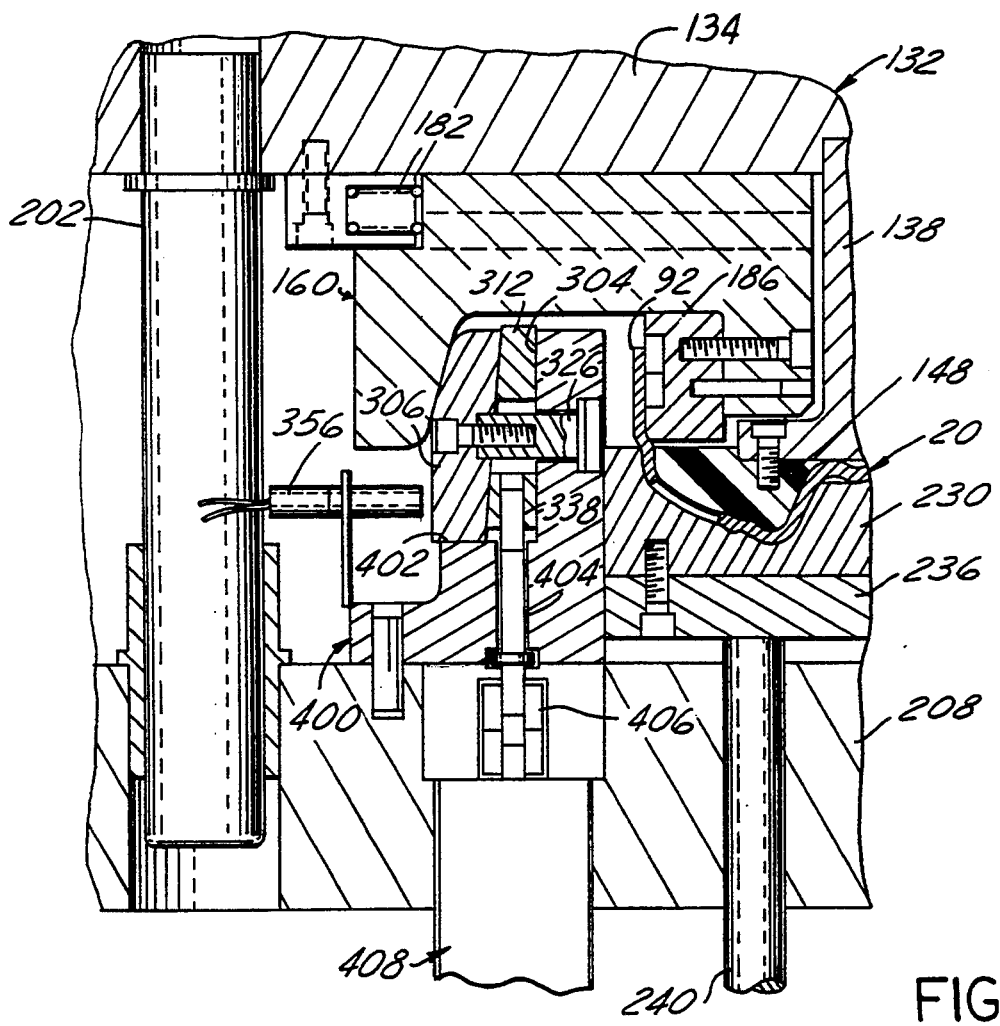
FIG. 10 is a fragmentary sectional view similar to FIG. 9 but illustrating a second modification of the die expand set-up adjustment mechanism.

FIG. 10 illustrates a modification of the wedge-cam adjustment set-up mechanism of FIG. 9 wherein a further modified cam ring 400 is provided, similar to ring 212 but modified in the manner of ring 300 to accommodate adjustment wedges 312 on their associated annular seating surfaces 402. In lieu of the worm gear driving system of the embodiment of FIG. 9 a modified output shaft 404 is provided for each wedge 312 which is directly driven by a chuck 406 of an associated servo motor 408 suitably mounted in die bolster 208. Sixteen such servo motor drives are thus provided, one for each of the driver cam dies 306, and are suitably electrically coupled to a conventional computer control system operable to individually and selectively control the adjustment position of each cam driver die 306 by the press set-up operator conveniently inputting a central computer keyboard and observing a CRT display (not shown). The position sensors 356 are again utilized in this system as in the FIG. 9 system to provide an electronic readout of individual cam die-adjusted positions, and are further utilized in a conventional feedback control loop system (not shown) to automatically control servo motors 408 to drive each associated cam driver 306 to selected adjusted position, as will be well understood from the foregoing description by those versed in the computer machine control system art. This fully automatic system of the embodiment of FIG. 10 thus provides the advantages of the shimless system of FIG. 9, and in addition further reduces set-up and running adjustment time by precisely and continuously controlling on a real time basis the diametrical dimensions of the expanded flange 92 of disc 20 during a production run.

Full Flange Disc Embodiment

Figure 14:
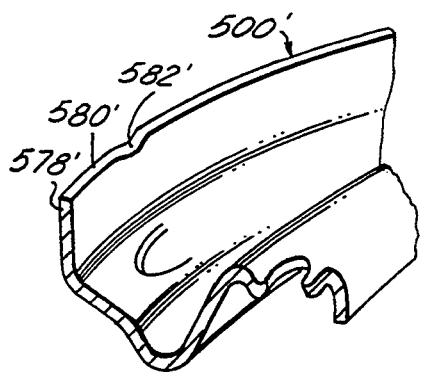
FIG. 14 is a fragmentary perspective cross-sectional view of a portion of the disc preform of FIG. 11 and illustrating on an exaggerated scale a flange waviness non-uniformity therein.
Figure 15:
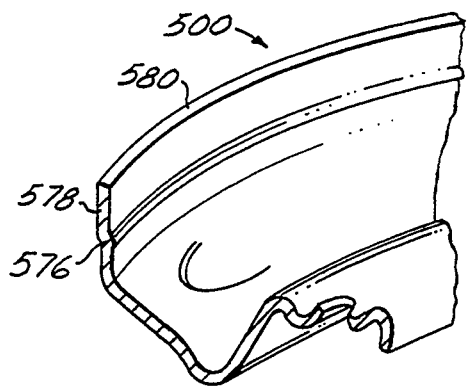
FIG. 15 is a fragmentary perspective cross-sectional view of a similar portion of the finished disc of FIG. 13 as made in accordance with the present invention and shown adjacent FIG. 14 for comparison purposes.
Figure 16:
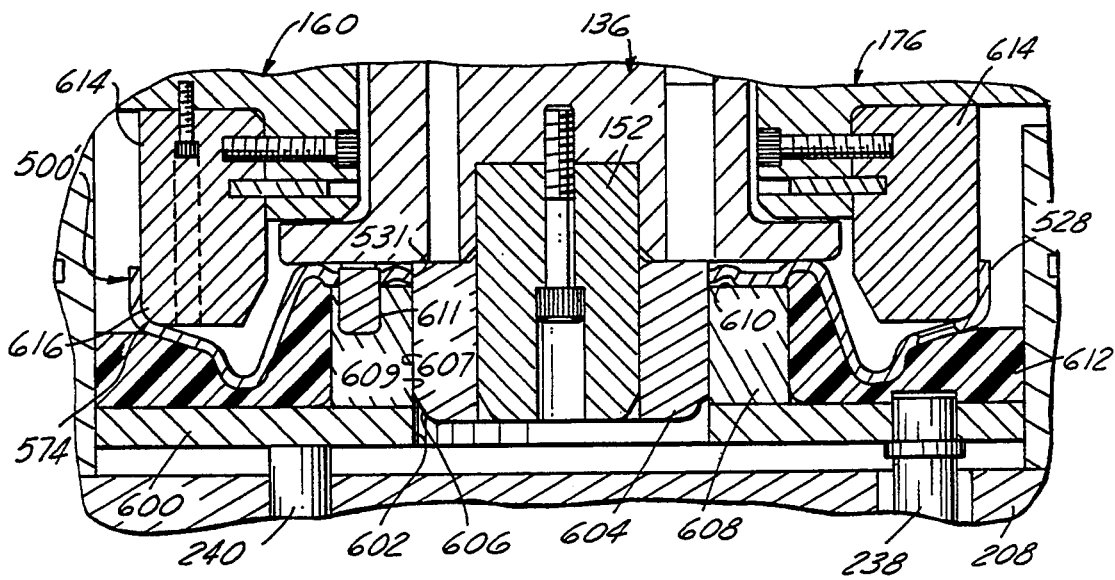
FIG. 16 is a fragmentary vertical sectional view showing a second embodiment of punch and die disc flange expand tooling employed in making the second embodiment of the disc of the invention, pursuant to the method and apparatus of the invention.

FIGS. 11, 13 and 15 illustrate so-called "full-flange" type of wheel disc 500 made in accordance with a second embodiment of the method, apparatus and wheel construction of the present invention. FIGS. 12, 14 and 16 illustrate a full flange disc preform 500' of the second embodiment made in accordance with the previously described first sequence of progressive forming steps of the method. Disc preform 500' generally corresponds to disc preform 20' of FIG. 5 except for the uninterrupted 360° type of mounting flange of the disc. This type of wheel disc is generally intended for heavier duty, light-truck wheel applications, rather than the passenger car applications in which the scalloped disc 20 is generally employed. However, disc 500 is generally similar to disc 20 in being constructed from sheet metal in one-piece with the three primary zones, namely, a central bolt-circle mounting pad zone 524, a reversely-curved annular hat section and window vent zone 526 and a mounting flange zone 528. Disc central zone 524 thus has a center pilot opening 530 defined by a radially extending marginal flange 532, a circular array of eight bolt holes 532, 534, 536, 538, 540, 542, 544, and 546 respectively surrounded by circumferentially interposed mounting pad bosses 548,550 . . . 562 which collectively define a mounting surface plane MP perpendicular to the center line axis 564 of disc 500. The intermediate disc zone 524 has a frusto conical portion 566 integrally joining center portion 524 to a hat section crown 568, and a window portion 570 with window vent openings 572 arranged in a circular row therein (FIG. 11). Window portion 570 merges radially outwardly through an annular bend portion 574 into an outwardly divergent annular shoulder portion 576 (FIG. 13) which in turn is integrally joined to a generally cylindrical mounting flange portion 578. The outer periphery 579 of mounting flange portion 578 is circumferentially continuous, rather than being interrupted by scallops as in disc 20, and thus the free edge 580 at the inboard end of flange 578 extends continuously for 360°; hence the term "full-flange" disc. Flange 578 preferably is expand-die finish formed so that the outer periphery thereof has a frusto conical taper angle divergent in an inboard direction between 0 and 2°. Although such a full flange adds weight to the disc, as does the 360° circumferentially continuous fillet weld employed at the junction of free edge 580 with the inner periphery of the associated wheel rim (not shown), this type of full flange disc construction is preferred for use in larger diameter wheels, e.g. 16" diameter, rated for heavier loads than the exemplary lighter weight scallop disc 20 intended, for example, for use in a 14" passenger car wheel application.

In accordance with the method and apparatus of the present invention, disc 500, like disc 20, is manufactured in two manufacturing sequences, the first sequence being the above described conventional multiple-stage cold working in progressive die stamping and draw tooling stations provided in a conventional multiple-stage high speed transfer press to cold form the disc preform 500'. The starting material is a flat circular (round) blank of sheet metal die cut from strip stock. This blank is automatically fed through the aforementioned eight or more stages of the transfer press to final form all of the features of disc 500 described hereinabove except for the final form of flange 580 of flange zone 528. The form of the disc as it emerges from the transfer press operation is shown as the disc preform 500' in FIGS. 12, 14 and 16. Because of the aforementioned difficulty in closely controlling the formation of the flange zone 528 in the progressive stages of the transfer press operation, flange mounting portion 578' of the preform 500 typically exhibits diametrical dimensional non-uniformities circumferentially of the flange similar to that exhibited in connection with the disc preform 20' of FIG. 5.

The second sequence of the method of the invention utilized in making the full flange disc embodiment 500, and the apparatus for performing the same in accordance with the invention, is illustrated in FIG. 16. As in the first embodiment, in this second sequence the disc preform 500' is subjected to a further cold working operation in the flange zone 528' to expand the same diametrically of the disc by a predetermined amount sufficient to circumferentially stretch the disc material in this portion beyond the yield limit of the material so that the material as so stretched takes a permanent set. Again, in this step, the diametrical circumferential non-uniformities in flange portion 578' such as the wariness 582' illustrated in exaggerated form in FIG. 14, are removed by the expansion stretching of the flange material. The mounting flange 578 at the completion of this step thus is characterized by having a predetermined slightly frusto conical shape, free of waviness and undulations circumferentially, and having uniform outside diametrical dimensions at the outer periphery 579 within substantially reduced tolerance limits than the corresponding dimensions of portion 578' of disc preform 500'.

The single step of the second sequence of the method is performed by a press set-up employing punch and die tooling 130 as described in conjunction with FIGS. 7 and 8, but modified in certain respects to accommodate the different configuration and dimensions of disc preform 500' as compared to disc preform 20'. Thus a larger diameter support plate 600 is provided having a larger center opening 602 coincident with the center opening 530 in preform 500'. An annular adapter centering ring 604 is affixed on the lower end of pilot 152 and has a lead-in chamfer 606 and cylindrical peripheral surface 607 to slidably engage the disc pilot opening disc flange 531 and thereby accurately center disc preform 500' with its axis 564 coincident with the tooling central axis during the initial down stroke travel of the press.

Support plate 600 also has an annular ring 608 affixed thereto and having an inner cylindrical surface 609 coincident with opening 602 in plate 600 and formed flat on its upper surface 610 to mate with the finished outboard face of the bolt circle portion of disc preform 528'. Die ring 608 has a guide pin 611 adapted to enter and register with a finished bolt hole in disc preform 500' to angularly orient the same on the die. An annular die cushion 612, made of slightly resilient urethane material, is also mounted on support plate 600 so as to encircle die ring 608, the upper face of cushion 612 being molded to the contour of the outboard face of the disc zone 526.

Each of the die holders 160 is provided with a modified expand die segment 614 adapted to nest at its radially outermost, lower corner 616 against the inner surface of disc shoulder 574 as shown in FIG. 16, wherein the respective parts are shown positioned at the start of the segmental die expansion travel after clamp 136 has seated on the inboard faces of the finished mounting pads 548, 550, etc. and firmly clamped disc preform 500' onto die ring 608 and against yieldable cushion 612, thereby accurately orienting the disc mounting MP perpendicular to the central tooling axis.

The punch and die tooling 130 as so modified in conjunction with the description of the structure of FIG. 16 is operated in the same manner as described previously to thereby cold work the flange zone 528' of disc preform 500 into the finished flange portion 578 shown in FIGS. 13 and 15. The resulting finished disc 500 thus has imparted to it the improved characteristics of the scalloped disc 20 for better assembly into, and better performance in conjunction with, an associated conventional mating wheel rim (not shown) having a drop center well into which disc 500 is press fit and welded in a conventional fashion.

It is to be understood that, in the method of construction of both the first and second disc embodiments 20 and 500 of the invention, the initial outside dimension of the starting blank for feeding into the transfer press forming operation is made slightly smaller than the corresponding outside dimension used in making (by transfer press operation only) a prior art disc for the same size rim. Likewise, the transfer press multiple stage tooling is appropriately modified in dimensional design to provide disc preforms 20' and 500' having a nominal outside diameter at their respective flange zones 92', 94' and 528' slightly undersize by a predetermined amount relative to the inside diameter of the well portion of the rim to be mated to the disc. The magnitude of this undersize diametrical allowance corresponds to the final increase in flange diameter accomplished by the radial expansion cold working, permanent set stretching operation performed in the second sequence of the method. Hence the final outside diameter of the finished flange portion 92 and 578 has the desired diametrical dimension and circumferential uniformity for precision press fitting into the associated rim, as will be now well understood by those skilled in the art from the foregoing description.

It will be evident from the foregoing description that the method and apparatus for constructing a wheel disc in accordance with the invention provides an improved wheel disc, and an improved wheel rim and disc assembly utilizing such disc exhibiting a reduction in radial run-out in both the disc flange and in the rim bead seats of the wheel assembly, as well as the other advantages set forth previously.

It is also to be understood that, although the foregoing description and drawings describe and illustrate in detail various preferred embodiments of the present invention, to those skilled in the art to which the present invention relates the present disclosure will suggest many modifications and constructions as well as widely differing embodiments and applications without thereby departing from the spirit and scope of the invention. The present invention, therefore, is intended to be limited only by the scope of the appended claims and the applicable prior art.

I claim:

1. A method of forming a one-piece sheet metal wheel disc of the type having a central bolt-circle mounting portion for fastening onto a wheel mounting part of a vehicle, a peripheral outer annular flange portion extending generally axially of said wheel disc to an inboard free edge of said disc and adapted for telescopic mounting into a mating wheel rim, and an intermediate annular window vent and hat portion integrally joining said central and flange portions, said method comprising the steps of:

(a) providing a flat sheet metal blank having a predetermined outside dimension and configuration adapted for progressive die cold forming into a preform of said wheel disc having an unfinished outer peripheral annular preform flange portion corresponding in shape generally to but slightly diametrically smaller than said disc flange portion, (b) subjecting said blank to a progressive cold working multiple stage die forming operation to produce said disc preform having the disc central portion in finished form with a circle of wheel mounting bolt holes, a center wheel mounting pilot opening and wheel mounting pads defining a mounting plane of said disc, having the disc window vent opening and hat section portion in finished form containing window vent openings, and having said unfinished outer peripheral annular preform flange portion in said diametrically undersize unfinished corresponding shape, and (c) subjecting said disc preform to a final cold working sizing operation wherein said preform flange is radially expanded to circumferentially stretch said preform flange beyond the yield point of the blank metal sufficiently to cause said preform flange to take a permanent set into a final predetermined expanded and finished shape adapted for precision telescopic mounting into the mating wheel rim.

2. The method as set forth in claim 1 wherein step (a) comprises providing said blank with a circular outside configuration, and step (b) further comprises progressive forming of said undersize preform flange portion so as to be circumferentially continuous in a 360° circle along the inboard free edge thereof, and wherein step (c) comprises radially expanding said preform flange in a portion thereof extending axially outboard of the disc from the free edge of the flange to thereby provide a finished full flange having an uninterrupted 360° inboard edge circumferentially of the disc.

3. The method as set forth in claim 1 wherein step (a) further comprises providing said blank with a predetermined polyhedral outside configuration adapted for transfer press forming of circumferentially alternating scalloped portions and spoke portions in said outer annular flange portion of said disc, wherein step (b) further comprises forming said preform flange portion with circumferentially alternating and equally angularly spaced scalloped and spoke portions which thereby define an interrupted inboard free edge for the disc, and wherein step (c) comprises radial expansion cold working at least the zone of said preform flange in the portion thereof extending in an outboard direction from the inboard free edge of the disc preform flange to at least beyond the outboardmost edge of the scallops formed in the preform flange portion to thereby provide a finished disc having a scalloped-type finished mounting flange.

4. The method as set forth in claim 1 wherein step (c) further comprises radially expanding a zone of said preform flange portion extending in a direction outboard of the disc from the inboard free edge thereof to an expansion-formed annular shoulder junction with an outer peripheral portion of said disc intermediate portion.

5. The method as set forth in claim 4 wherein step (a) further comprises providing said blank with a predetermined polyhedral outside configuration adapted for transfer press forming of circumferentially alternating scalloped portions and spoke portions in said outer annular flange portion of said disc, wherein step (b) further comprises forming said preform flange portion with circumferentially alternating and equally angularly spaced scalloped and spoke portions which thereby define an interrupted inboard free edge for the disc, and wherein step (c) comprises radial expansion cold working at least the zone of said preform flange in the portion thereof extending in an outboard direction from the inboard free edge of the disc preform flange to at least beyond the outboardmost edge of the scallops formed in the preform flange portion to thereby provide a finished disc having a scalloped-type mounting flange, and wherein said annular shoulder junction is disposed outboard of and adjacent to the outboardmost edge of said flange scallops.

6. The method as set forth in claim 1 wherein step (c) further comprises first fixturing said disc preform in a press containing a radially expansible segmental die tooling set-up including a plurality of expand die segments disposed in a circular array about a central axis of the press tooling such that the mounting plane of said disc is oriented perpendicular to the dress axis, centering said disc preform by inserting a centering pilot of said tooling into said center pilot opening of said preform, and then causing said permanent deformation expansion of said preform flange by radially expanding said expand die segments against a radially inwardly facing surface of said preform flange portion.

7. A method of accurately forming an assembled wheel having a rim defining a tire engaging bead seat and a wheel disc mounted therein comprising the steps of:
   (a) separately forming a wheel rim with a disc-mounting surface finished to predetermined dimensions;
   (b) separately progressively die forming said wheel disc to form a central bolt-circle wheel-mounting portion with a center pilot opening therein, a peripheral flange portion for mounting said disc to said rim and an intermediate portion containing window vent openings and integrally joining said central and peripheral flange portions of said disc, said disc having at least portions of the peripheral flange portion that are in an out-of-round condition circumferentially which create a non-uniform radial run-out condition relative to the center axis of the disc;
   (c) permanently re-forming the out of round portions of the peripheral flange of the disc by permanently set cold working of said flange sufficient to ensure roundness and circumferential uniformity thereof at a dimension adapted to provide a precision fit of the disc in said wheel rim during assembly thereof to form said wheel assembly; and
   (d) assembling said disc in said rim by telescopically interengaging said permanently re-formed disc flange and said disc-mounting surface of said rim.

8. A process for assembling and joining together a rim and its disc into a disc wheel, wherein said rim and said disc are each made from a sheet of metal strip stock by cold working, said process comprising the steps of:
   (a) separately prefabricating said rim and said disc so that said disc has a rim-mounting peripheral flange portion which is undersized in diameter with respect to its final diameter for telescopic assembly into the rim;
   (b) permanently shaping the peripheral flange portion of said disc by means of a tool acting radially outwardly uniformly around the inner peripheral surface of said flange portion to cause said flange portion to be permanently set at a radially expanded final finished dimension to thereby provide a precision re-formed flange adapted for precision fit in said rim;
   (c) assembling said disc in said rim such that said precision re-formed flange of said disc slidably telescopes into a mating mounting surface of said rim; and
   (d) then welding said disc to said rim at the junction of the inboard edge of said disc re-formed flange portion and the mating surface of the rim while maintaining said precision fit.

9. A method of manufacturing a wheel disc adapted for telescopic press fit mounting into a mating wheel rim to form a wheel assembly, said method comprising the steps of:
   (a) progressively die forming from a metal strip a disc preform having a cross-sectional contour proximating that of the finished disc; and
   (b) uniformly radially expanding a peripheral flange portion of said disc preform by application of radial expansion pressure to substantially the entire inner circumference of said peripheral flange portion of said disc preform to permanently deform the same into a finished flange portion on said disc having precision finished predetermined dimensions adapted for the telescopic press-fit mounting into the mating wheel rim.

10. The method set forth in claim 9 further wherein step (a) further comprises locating and final sizing a center pilot opening in said disc preform in said progressive die forming operation, and wherein step (b) further comprises subsequently utilizing said sized center opening to locate the disc relative to radial expansion die forming segments in press tooling to thereby ensure concentricity of the finished flange portion upon completion thereon of the cold die radial expansion forming operation.

* * * * *